Figure 1:
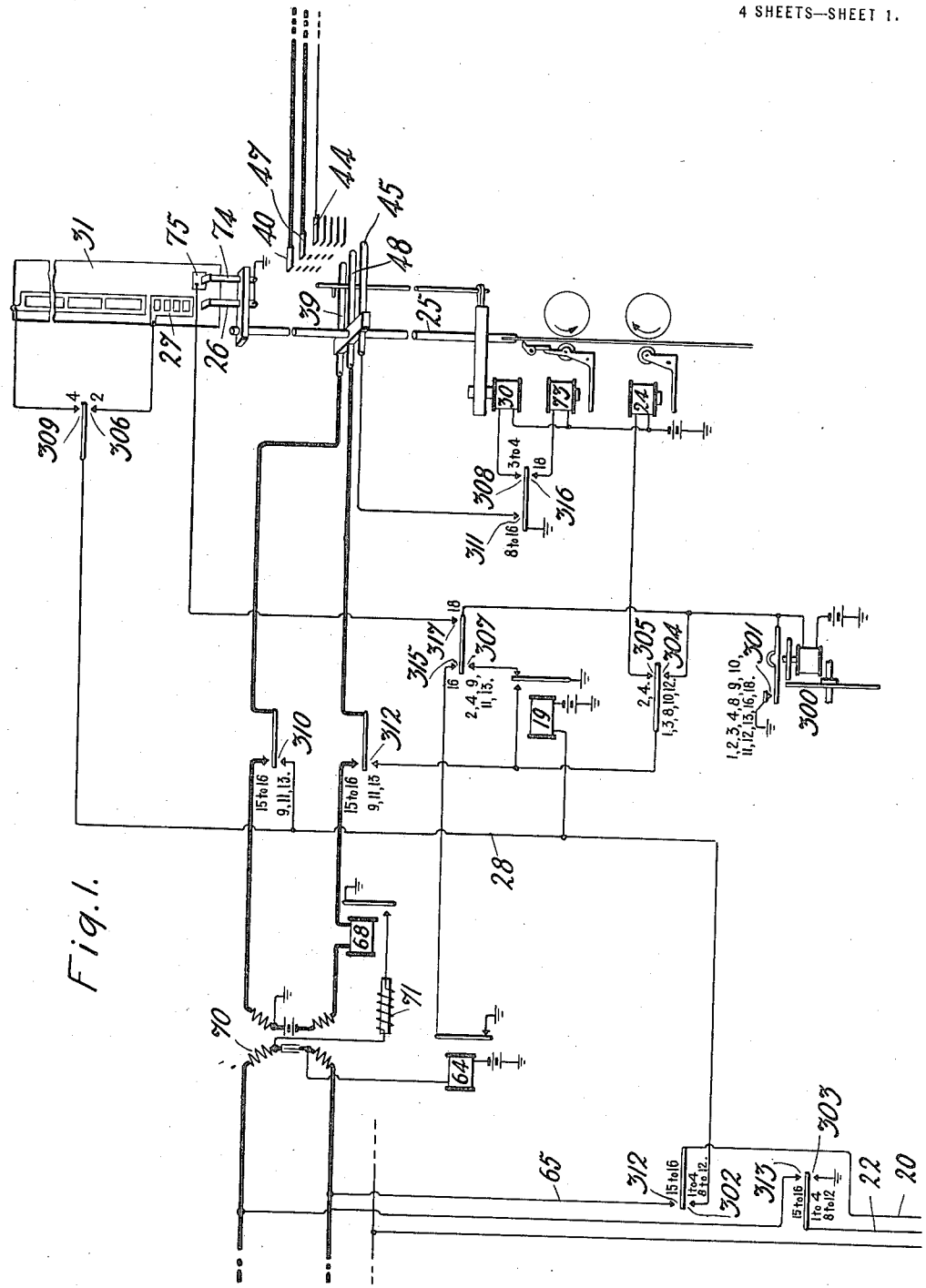

A. E. LUNDELL & H. G. EDDY.
TESTING SENDER.
APPLICATION FILED FEB. 5, 1917.

1,277,615.

Patented Sept. 3, 1918
4 SHEETS—SHEET 3.

Inventors:
Alben E. Lundell.
Herbert G. Eddy.
by [signature] Att'y.

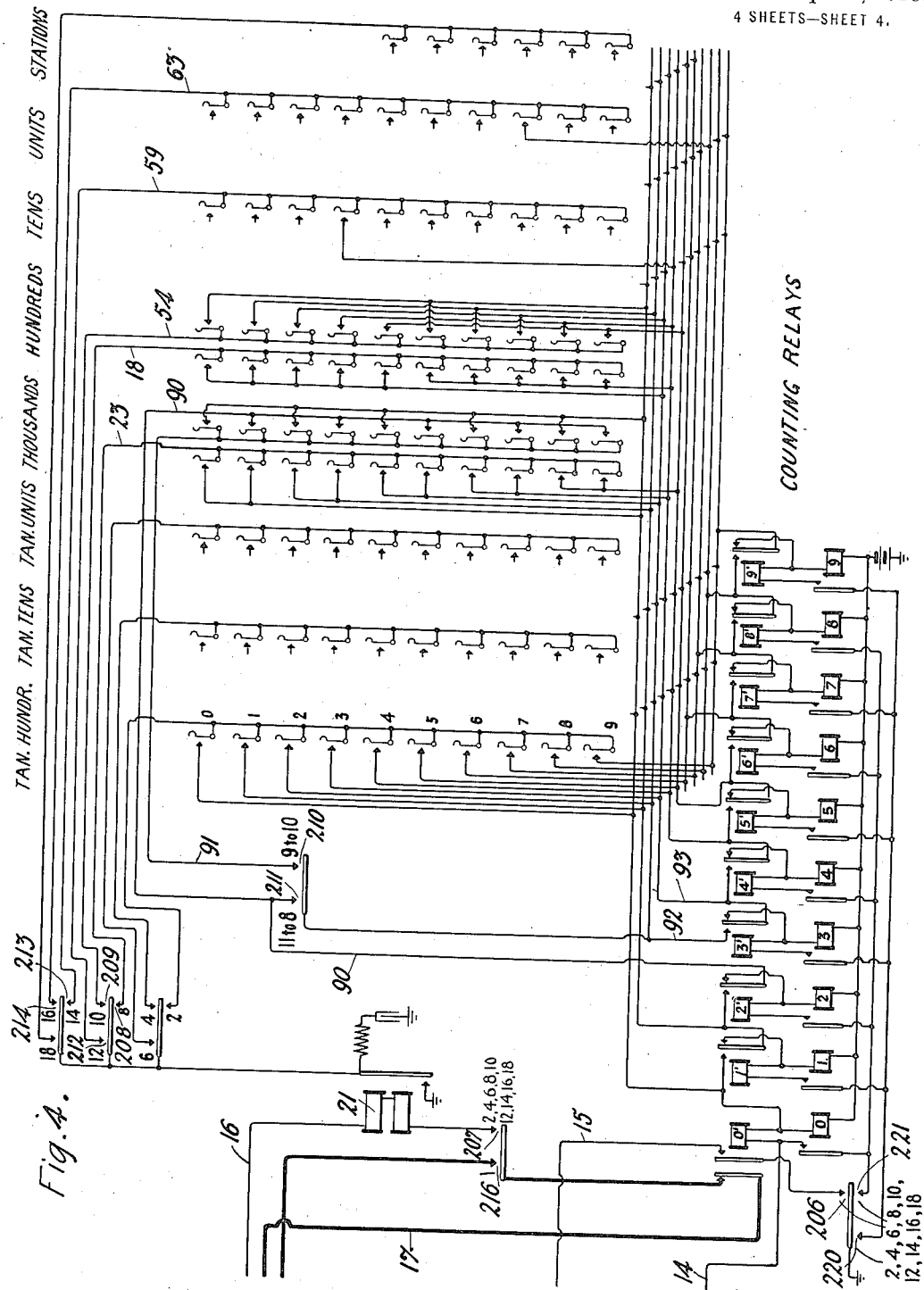

UNITED STATES PATENT OFFICE.

ALBEN E. LUNDELL, OF NEW YORK, N. Y., AND HERBERT G. EDDY, OF BAYONNE, NEW JERSEY, ASSIGNORS TO WESTERN ELECTRIC COMPANY, INCORPORATED, OF NEW YORK, N. Y., A CORPORATION OF NEW YORK.

TESTING-SENDER.

1,277,615.      Specification of Letters Patent.    Patented Sept. 3, 1918.

Application filed February 5, 1917. Serial No. 146,676.

*To all whom it may concern:*

Be it known that we, ALBEN E. LUNDELL and HERBERT G. EDDY, citizens of the United States, residing at New York, in the county of Bronx and State of New York, and at Bayonne, in the county of Hudson and State of New Jersey, respectively, have invented certain new and useful Improvements in Testing-Senders, of which the following is a full, clear, concise, and exact description.

This invention relates to a testing arrangement for use in automatic telephone exchange systems.

More particularly, this invention relates to a wire chief's equipment by means of which such operator may directly set apparatus to determine the accuracy of operation of such apparatus.

It is the object of this invention to provide a sending equipment which may readily be associated with the apparatus to be tested, and to provide means whereby the progress and success of the desired connection may be supervised.

In routine testing of this type, it is customary to call the same station repeatedly, and it is therefore desirable to use a sender in which the successive tests may be made without resetting of such sender.

It is then an additional object of this invention to provide a sending arrangement in which the same selection may be controlled any desired number of times without resetting of the sender keys.

A feature of the invention is an arrangement by which a sender and its associated apparatus is restored to normal in condition for reoperation upon the completion of each call.

Another feature of the invention is the provision of a relay operated signal to discriminate between busy and idle trunks.

A further feature will be found in the manner of wiring the counting relays to the key set, by means of which translation is accomplished in a very simple manner.

In the following description it has been assumed that the testing operator has plugged in on a trunk terminating in an incoming selector switch. The device is, however, also arranged to operate indicating devices at a manual operator's position if the incoming trunk plugged into terminates at such a position. Since the operation of the sending device is practically the same in both cases, a detailed description of its operation in connection with automatic switches has been considered sufficient.

The invention has been shown in a preferred form but is not to be restricted to the particular arrangement shown nor to use with switches of the type disclosed.

It is thought that the invention will best be understood from the following detailed description, reference being had to the accompanying drawings.

Figure 2:
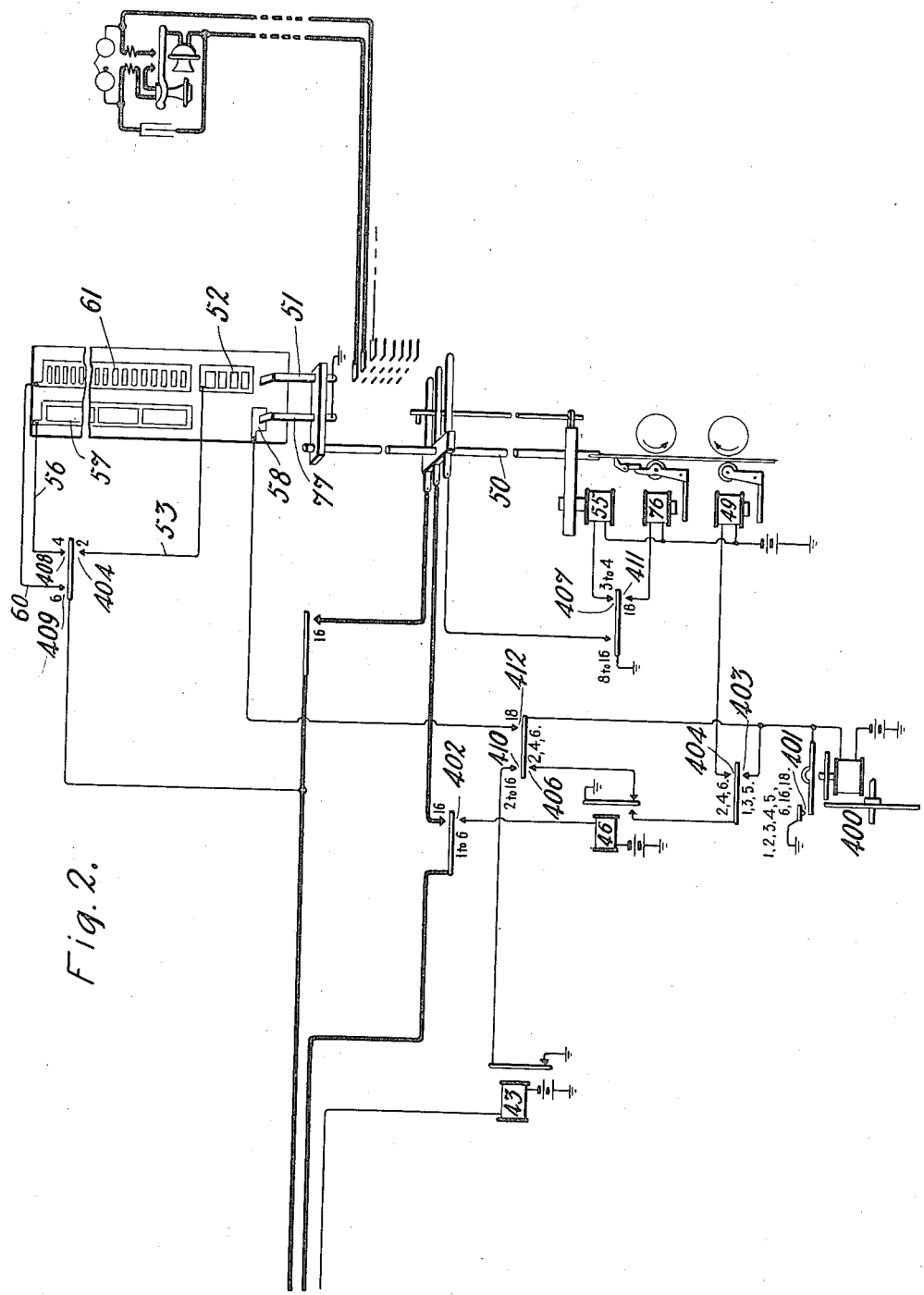
Figure 3:
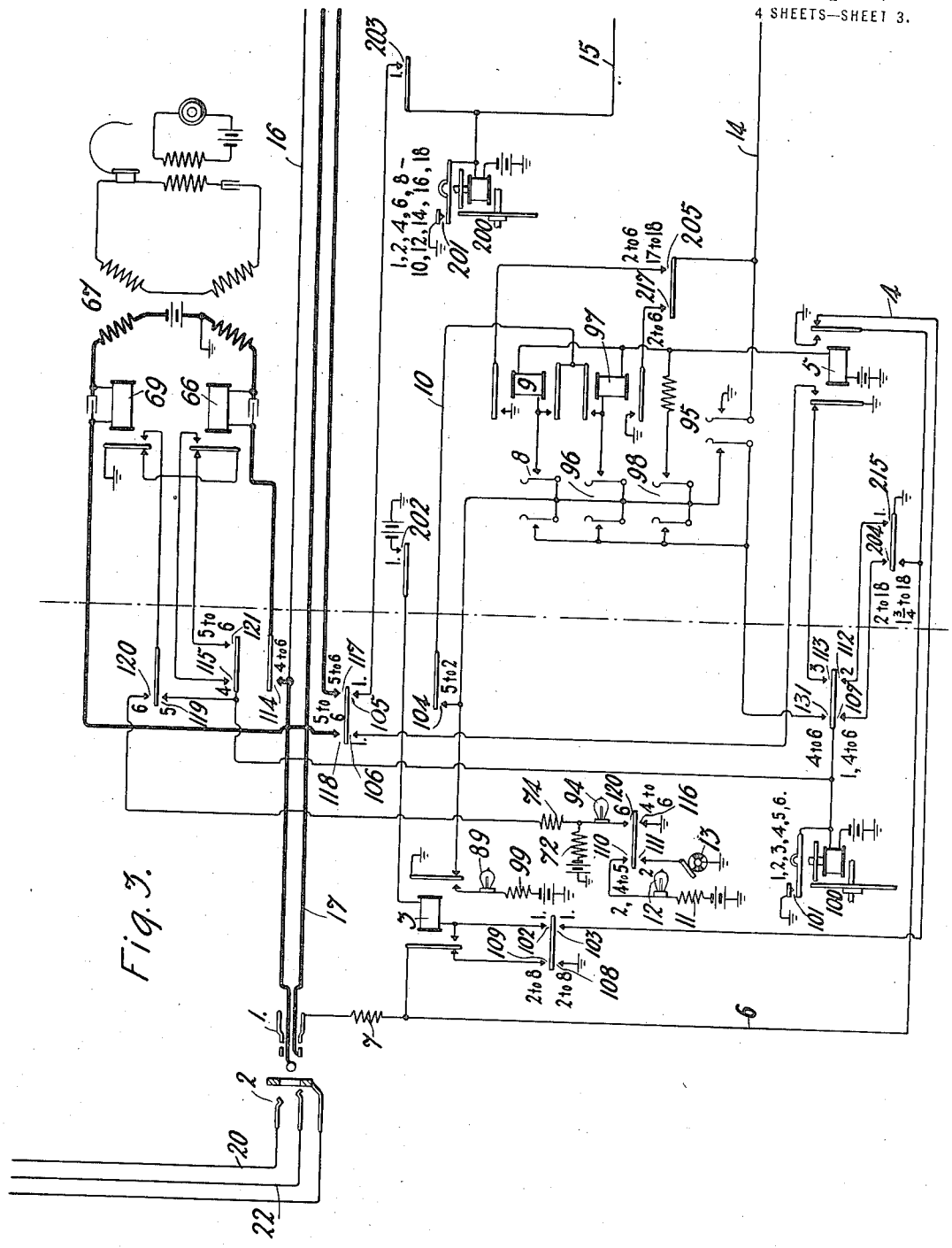

Figure 1 shows portions of the circuits of an incoming switch to be tested, and Fig. 2 shows portions of the operating circuits of a final switch. Fig. 3 shows a wire chief's testing circuit with a controlling sequence switch for the same. To the right of the dotted line in Fig. 3 is shown a sender controlling sequence switch and start keys. Fig. 4 shows a key set, together with a set of counting relays, and the manner in which the counting relays are connected to the key set.

If now we assume that the testing operator desires to call substation No. 9837, he will depress key No. 9 in the thousands column, key No. 8 in the hundreds column, key No. 3 in the tens column and key No. 7 in the units column.

Since the switches to be set are of the five hundred point panel type such as described in patent to A. E. Lundell, No. 1,168,319, a trunk terminating in the fourth sub-group of the fifth main group of trunks at the incoming switch being tested must be seized, and at the final switch, the desired line will be found in the fourth main group. The manner in which the desired number of impulses are sent in accordance with the translated setting of the key set will appear later in the description.

Plug 1 is inserted into a test jack 2 associated with the incoming switch to be tested. If now we assume that an idle condition of a trunk terminating in the incoming switch to be tested is indicated by the absence of ground on the sleeve contact of jack 2, and that the busy condition of such trunk is indicated by the presence of ground thereon, a circuit will be completed from grounded battery, contact 202, winding of relay 3, contacts 102, 103, conductor 4, right-hand armature and back contact of relay 5, conductor 6, resistance 7, sleeve contacts of plug 1 and jack 2, to ground if the trunk is busy. Under this assumption relay 3 will be energized, locking itself to ground through resistance 7 at its left-hand armature and front contact, and, at its right-hand armature, completing a circuit from grounded battery, resistance 99, lamp 89, right-hand armature and front contact of relay 3 to ground. The lighting of lamp 89 will indicate to the testing operator that the trunk plugged into is busy, and he will remove plug 1 from jack 2.

If the trunk is idle, relay 3 will not be energized, and since lamp 89 does not light, the operator is informed that he has plugged into a trunk terminating in an idle switch, and will proceed with the test. Since no tandem impulses and no stations impulses are to be sent, the operator will depress start key 8. A circuit is thereupon completed from grounded battery, winding of relay 5, winding of relay 9, right-hand closed contacts of key 8, right-hand armature and back contact of relay 3 to ground. Relays 5 and 9 are energized and are held energized in a locking circuit extending from grounded battery, winding of relay 5, winding of relay 9, lower armature and front contact of relay 9, conductor 10, contact 104, right-hand armature and back contact of relay 3, to ground. Relay 5 at its right-hand armature applies ground to conductor 6 extending to the test terminals associated with the sleeve contact of jack 2, to render the trunk being tested busy to other apparatus. At the left-hand armature of relay 5 a circuit is completed from grounded battery, power magnet of sequence switch 200, contact 203, contacts, 105, 106, left-hand armature and front contact of relay 5 to ground. This circuit moves sequence switch 200 from position 1 to position 2 under the control of its normal contact 201.

When sequence switch 200 arrives in position 2, a circuit is completed from grounded battery, power magnet of sequence switch 100, contacts 107, 204, to ground, for moving sequence switch 100 out of position 1 and into position 2 under the control of its normal contact 101. In position 2 of sequence switch 100, ground is applied to the sleeve contact of jack 2 through contacts 108, 109, left-hand armature and back contact of relay 3 and resistance 7.

A circuit is also completed from grounded battery, resistance 11, lamp 12, contacts 110, 111, interrupter 13, to ground. The lamp 12 is intermittently lighted in this circuit by the action of interrupter 13, and its flashing informs the testing operator that the test has been successfully started.

When sequence switch 200 arrived in position 2, a circuit was completed from grounded battery, winding of the 0 counting relay, and winding of the 0' counting relay, conductor 14, contact 205, upper armature and front contact of relay 9 to ground. The 0 and 0' counting relays are energized, the 0' counting relay completing a circuit from grounded battery, power magnet of sequence switch 200, conductor 15, inner armature and front contact of the 0' counting relay, contact 206, to ground, which moves sequence switch 200 through positions 2, 4 and 6, and into position 8.

The fundamental circuit is now completed from grounded battery, winding of line relay 19, contact 302, conductor 20, tip contacts of jack 2 and plug 1, conductor 16, winding of stepping relay 21, contact 207, outer armature and back contact of the 0' counting relay, conductor 17, ring contacts of plug 1 and jack 2, conductor 22, contact 303, to ground.

Line relay 19 and stepping relay 21 are energized in this circuit, line relay 19 completing a circuit from grounded battery, power magnet of sequence switch 300, contact 304, front contact and armature of relay 19 to ground, which moves sequence switch 300 from position 1 into position 2.

The energization of stepping relay 21 completed a circuit from grounded battery, winding of the No. 4 counting relay, armature and back contact of the No. 4' counting relay, closed contacts of depressed key 9 in the thousands column, conductor 23, contact 208, armature and front contact of stepping relay 21, to ground. The energization of the No. 4 counting relay prepares a circuit for the No. 4' counting relay, but this relay does not energize, since it is shunted by the ground at the armature and front contact of stepping relay 21.

In position 2 of sequence switch 300, a circuit is completed from grounded battery, winding of up-drive magnet 24, contact 305, armature and front contact of relay 19 to ground. The energization of magnet 24 causes the brush rod 25 to be elevated, moving the brush sets carried thereby into position to be tripped, and at the same time moving a brush 26 over a commutator 27 to complete a circuit for shunting out the stepping relay in the well-known manner whenever brush 26 engages a conducting segment of commutator 27, this circuit extending from grounded battery, winding of relay 19, conductor 28, contact 306, conducting segments of commutator 27, brush 26 to ground. The intermittent shunting of stepping relay 21 causes the actuation of the counting relays in the well-known manner, and when the 0' counting relay is energized, the lower branch of the circuit of relay 19 is permanently opened, and when, a moment later, brush 26 engages an insulating segment of commutator 27, relay 19 deënergizes and breaks the circuit of up-drive magnet 24.

Since the No. 4 counting relay was the first of the chain to be energized, five impulses will be sent, and the fifth brush will be in a position to be tripped, the fifth brush being the one which serves lines 8000 to 9999.

Upon the deënergization of relay 19, a circuit is completed from grounded battery, power magnet of sequence switch 300, contact 307, armature and back contact of relay 19 to ground, which moves sequence switch 300 out of position 2 and into position 3. When the 0' counting relay was energized, a circuit was completed from grounded battery, power magnet of sequence switch 200, conductor 15, inner armature and front contact of the 0' counting relay, contact 205 to ground, which moves sequence switch 200 from position 8 to position 10. On leaving position 8, the locking circuit of the counting relays is broken at contacts 220 and 221, and they are all restored.

When sequence switch 200 comes to rest in position 10, relay 19 is again energized over a circuit from grounded battery, winding of relay 19, contact 302, conductor 20, tip contacts of jack 2 and plug 1, conductor 16, winding of stepping relay 21, contact 207, outer armature and back contact of the 0' counting relay, conductor 17, ring contacts of plug 1 and jack 2, conductor 22, contact 303 to ground. Upon energization relay 19 completes a circuit from grounded battery, power magnet of sequence switch 300, contact 304, armature and front contact of relay 19 to ground, which moves sequence switch 300 out of position 3 and into position 4.

Through positions 3 and 4 of sequence switch 300 a circuit is completed from grounded battery, winding of trip magnet 30, contact 308, to ground, which releases a positioned set of brushes so that, on the subsequent upward movement of the brush shaft, they will engage terminals in a desired main group.

In position 4 of sequence switch 300, a circuit is completed from grounded battery, winding of up-drive magnet 24, contact 305, armature and front contact of relay 19 to ground. The brush rod 25 is again moved upwardly. During upward motion of the brush rod, the circuit through stepping relay 21 is shunted by a path over conductor 28, contact 309, commutator 31, brush 26 to ground.

In position 10 of sequence switch 200, a circuit is completed from grounded battery, winding of the No. 3 counting relay, armature and back contact of the No. 3' counting relay, closed left-hand contacts of key 8 in the hundreds column, conductor 18, contact 209, armature and front contact of stepping relay 21 to ground. The No. 3 counting relay, upon energization, prepares a circuit for the No. 3' counting relay, which relay is energized upon the first deënergization of stepping relay 21 in response to the shunting action of the circuit through commutator 31, as previously described. Upon the next energization of stepping relay 21, a circuit is completed from grounded battery, winding of the No. 2 counting relay, armature and back contact of the No. 2' counting relay, conductor 90, closed right-hand contacts of depressed key 9 in the thousands column, conductor 91, contact 210, conductor 92, armature and front contact of the No. 3' counting relay, conductor 93, closed left-hand contacts of depressed key No. 8 in the hundreds column, conductor 18, contact 209, armature and front contact of stepping relay 21 to ground. The No. 2 counting relay upon energization, prepares a circuit for the No. 2' counting relay, which relay is energized upon the second energization of stepping relay 21, in the well-known manner. The No. 1 and the 0 counting relays are energized over a path to ground at the armature and front contact of a stepping relay similar to the path described for counting relay No. 2, and when the 0' counting relay is energized, the lower branch of the circuit of relay 19 is opened as before, and when brush 26 engages an insulating segment of commutator 31, relay 19 will deënergize, opening the circuit of up-drive magnet 24. Since four impulses were sent the tripped brush set will now be in a position below the first terminal in the fourth sub-group of terminals, this sub-group containing trunk terminals leading to a final switch serving the lines 9500 to 9999. It is to be observed that during the sending of the incoming group selecting impulses, the number of impulses sent is controlled jointly by keys depressed in the thousands and hundreds column through contacts 210 and 211.

Upon the deënergization of relay 19, a circuit is completed from grounded battery, power magnet of sequence switch 300, contact 307, armature and back contact of relay 19 to ground, for moving sequence switch 300 out of position 4 and into position 8.

The 0' counting relay at its inner armature completes a circuit for advancing sequence switch 200, which then moves into position 12, the counting relays being restored when the sequence switch 200 leaves position 10.

It is to be understood that trunk hunting occurs in some position of sequence switch 300 between 4 and 8, and upon completion of the hunting movement, the sequence switch is moved into position 8. Since this is a well-known operation, it has not been considered necessary to disclose it in the present description. A complete disclosure of the hunting movement may be found in Patent No. 1,232,944, issued July 10, 1917, to A. E. Lundell or in Patent No. 1,212,809, issued Jan. 16, 1917 to F. N. Reeves and A. E. Lundell.

With sequence switch 300 in position 8 and sequence switch 200 in position 12, the fundamental circuit is again completed as previously described. Relay 19 upon energization completes a circuit from grounded battery, power magnet of sequence switch 300, contact 304, to ground at the armature and front contact of relay 19, which moves sequence switch 300 from position 8 to position 9.

With sequence switch 300 in position 9 and relay 19 energized, a circuit is completed from grounded battery, winding of relay 46, contact 402, terminal 47, brush 48, contact 312, armature and front contact of relay 19 to ground. Relay 46, upon energization, completes a circuit from grounded battery, power magnet of sequence switch 400, contact 403, armature and front contact of relay 46 to ground, which moves sequence switch 400 from position 1 to position 2 under the control of its normal contact 401.

In position 2 of sequence switch 400, a circuit is completed from grounded battery, winding of up-drive magnet 49, contact 404, armature and front contact of relay 46 to ground. The final brush rod is moved upward under the control of up-drive magnet 49 and causes a brush 51 to be advanced over a commutator 52, thereby completing a circuit in shunt of the fundamental circuit extending from grounded battery, winding of relay 19, contact 310, brush 39, terminal 40, conductor 41, contact 404, conductor 53, commutator 52, brush 51 to ground.

Upon the first energization of stepping relay 21, a circuit is completed from grounded battery, winding of the No. 3 counting relay, armature and back contact of the No. 3' counting relay, closed right-hand contacts of key No. 8 in the hundreds column, conductor 54, contact 212, armature and front contact of stepping relay 21 to ground. Brush 51 in passing over commutator 52, shunts out stepping relay 21 to actuate the counting relays in the well-known manner. When the 0' counting relay is energized and brush 51 engages an insulating segment of commutator 52, relay 19 is deënergized deënergizing in turn relay 46, which opens the circuit of up-drive magnet 49 and brings the brush set operated by rod 50 into a position wherein the fourth set of brushes, which serves lines 9800 to 9899, may be tripped.

The deënergization of relay 19 completed a circuit from grounded battery, power magnet of sequence switch 300, contact 307, armature and back contact of relay 19 to ground, for moving sequence switch 300 out of position 9 and into position 10. The deënergization of relay 46 completed a circuit from grounded battery, power magnet of sequence switch 400, contact 406, armature and back contact of relay 46, to ground, for moving sequence switch 400 out of position 2 and into position 3.

In position 3 of sequence switch 400, a circuit is completed from grounded battery, winding of trip magnet 55, contact 407 to ground, which operates magnet 55 to release the fourth brush set.

The 0' counting relay at its inner armature completes a circuit to move sequence switch 200 out of position 12 and into position 14.

The fundamental circuit is then again completed through relays 19 and 21, as previously described, relay 19 completing a circuit from grounded battery, power magnet of sequence switch 300, contact 304, armature and front contact of relay 19 to ground, to move sequence switch 300 out of position 10 and into position 11, whereupon relay 46 is energized over a circuit previously traced and completes a circuit from grounded battery, power magnet of sequence switch 400, contact 403, front contact and armature of relay 46 to ground, which moves sequence switch 400 from position 3 to position 4.

In position 4 of the sequence switch 400, the circuit of up-drive magnet 49 is completed as previously described, and the brush rod 50 is again moved upwardly. At this stage of operation a circuit in shunt of the fundamental circuit is completed from grounded battery, winding of relay 19, contact 310, brush 39, terminal 40, conductor 41, contact 408, conductor 56, commutator 57, brush 77, to ground, whenever brush 77 engages a conducting segment of commutator 57.

Upon the first energization of stepping relay 21, a circuit is completed from grounded battery, winding of the No. 3 counting relay, armature and back contact of the No. 3' counting relay, conductor 92, closed contacts of key No. 3 in the tens column, conductor 59, contact 213, armature and front contact of stepping relay 21, to ground. The counting relays are actuated in the well-known manner, and line relay 19 will be deënergized when the 0' counting relay is energized and brush 77 engages an insulating segment of commutator 57. At this time the tripped brush will be at the bottom of the sub-group of terminals containing the lines 9830 to 9839.

The deënergization of relay 19 results in the deënergization of relay 46, which opens the circuit of up-drive magnet 49 and brings the brush rod 50 to rest. Relay 46 also completes a circuit from grounded battery, power magnet of sequence switch 400, contact 406, armature and back contact of relay 46, to ground, for moving sequence switch 400 out of position 4 and into position 5. Relay 19 upon deënergization completes a circuit from grounded battery, power magnet of sequence switch 300, contact 307, armature and back contact of relay 19 to ground, for moving sequence switch 300 out of position 11 and into position 12.

The 0′ counting relay when energized completed a circuit to move sequence switch 200 from position 14 to position 16, and during such movement the locking circuit of the counting relays is broken as before.

In position 12 of sequence switch 300 and in position 16 of sequence switch 200, the fundamental circuit is established as before, energizing relays 19 and 21. Relay 19 completes a circuit from grounded battery, power magnet of sequence switch 300, contact 304, armature and front contact of relay 19, to ground, for moving sequence switch 300 out of position 12 and into position 13. In position 13 of sequence switch 300, relay 46 is energized as before and completes a circuit from grounded battery, power magnet of sequence switch 400, contact 403, armature and front contact of relay 46 to ground, for moving sequence switch 400 out of position 5 and into position 6.

In position 6 of sequence switch 400, a circuit is completed from grounded battery, winding of up-drive magnet 49, contact 404, armature and front contact of relay 46 to ground, whereupon brush rod 50 is again advanced under the control of magnet 49.

A circuit in shunt of the fundamental circuit is established from grounded battery, winding of relay 19, contact 310, brush 39, terminal 40, contact 409, conductor 60, commutator 61, brush 51, to ground, whenever brush 51 engages a conducting segment of commutator 61.

The first energization of stepping relay 21 completed a circuit from grounded battery, winding of the No. 7 counting relay, armature and back contact of the No. 7′ counting relay, closed contacts of the No. 7 key in the units column, conductor 63, contact 214, armature and front contact of stepping relay 21 to ground. As the brush rod 50 moves upwardly, the counting relays are successively actuated, and when the 0′ counting relay is energized and brush 52 engages an insulating segment of commutator 61, relay 19 will be deënergized, deënergizing in turn relay 46, which opens the circuit of up-drive magnet 49 and brings the brush set to rest on the terminals of the desired line. Relay 46 in deënergizing also completes a circuit from grounded battery, power magnet of sequence switch 400, contact 406, armature and back contact of relay 46, to ground, which moves this sequence switch from position 6 to position 16, which is the talking position. Relay 19 upon deënergization, completes a circuit from grounded battery, power magnet of sequence switch 300, contact 307, armature and back contact of relay 19 to ground, which moves sequence switch 300 from position 13 to position 16, in which position ringing takes place.

The 0′ counting relay completed a circuit for moving sequence switch 200 out of position 16 and into position 18. On arriving in position 17, a circuit is completed from grounded battery winding of the 0 counting relay, winding of the 0′ counting relay, conductor 14, contact 205, upper armature and front contact of relay 9, to ground. This maintains the 0′ counting relay energized until sequence switch 200 leaves position 18. The circuit of the power magnet of sequence switch 200 thus remains completed in position 18 of sequence switch 200 and this sequence switch moves through position 18 and into position 1. It will be seen, therefore, that the actuated condition of relay 9 prevents sequence switch 200 from coming to rest in position 18, in which position the stations impulses would be sent if the call were to be directed to an indicating device at a manual operator's position.

When sequence switch 200 arrives in position 1, a circuit is completed from grounded battery, magnet of sequence switch 100, contacts 112, 215, to ground, for moving sequence switch 100 out of position 2 and into position 3. When sequence switch 100 leaves position 2, the locking circuit of relays 5 and 9 is broken at contact 104, and these relays are deënergized. The deënergization of relay 5 completes a circuit from grounded battery, power magnet of sequence switch 100, contact 113, left-hand armature and back contact of relay 5 to ground, for moving sequence switch 100 out of position 3, and into position 4. When sequence switch 100 arrives in position 4, a circuit is completed from grounded battery, resistance 11, lamp 12, contacts 110, 116, to ground, causing lamp 12 to burn steadily, thereby informing the testing operator that the impulses have been sent and that ringing current is being applied to the wanted line.

In position 16 of sequence switch 300, ringing current is applied to the wanted line, and when sequence switch 100 arrives in position 5, circuit is completed from grounded battery, winding of relay 64, lower left-hand winding of repeating coil 70, conductor 65, contact 312, conductor 20, tip contacts of jack 2 and plug 1, contact 114, winding relay 66, lower left-hand winding of repeating coil 67 to ground. Relay 66 is energized and completes a circuit from grounded battery, power magnet of sequence switch 100, contact 115, armature and front contact of relay 66, and armature and back contact of relay 69 to ground, for moving sequence switch 100 out of position 4 and into position 5.

When the called subscriber answers, supervisory relay 68 is energized in the well-known manner and a circuit is completed from ground, front contact and armature of relay 68, impedance coil 71, upper left-hand winding of repeating coil 70, contact 313, conductor 22, ring contacts of jack 2 and plug 1, conductor 17, outer armature and back contact of the 0' counting relay, contact 216, contacts 117, 118, winding of relay 69, upper left-hand winding of repeating coil 67 to grounded battery. Relay 69 is energized in this circuit and completes a circuit from grounded battery, power magnet of sequence switch 100, contact 119, armature and front contact of relay 69 to ground, for moving sequence switch 100 out of position 5 and into position 6.

In position 6 of sequence switch 100, the testing operator may converse with the called party and determine whether connection has been established with the desired line. In position 6 of sequence switch 100, a circuit is completed from grounded battery, resistance 72, lamp 94, contacts 120, 116, to ground, but lamp 94 does not light, since it is shunted by a path through resistance 74, contact 120, to ground at the armature and front contact of relay 69.

Upon completion of conversation, the testing operator withdraws plug 1 from jack 2, whereupon relays 69 and 66 will be deënergized. A circuit is then completed from grounded battery, power magnet of sequence switch 100, contact 121, armature and back contact of relay 66, armature and back contact of relay 69, to ground, for moving sequence switch 100 out of position 6 and into its first or normal position under the control of its normal contact 101. The deënergization of relay 69 removed the shunt about lamp 94 and this lamp is lighted during the return of the sequence switch to its normal position.

At the incoming switch the removal of plug 1 from jack 2 caused the deënergization of relay 64, whereupon a circuit is completed from grounded battery, power magnet of sequence switch 300, contact 315, armature and back contact of relay 64 to ground, which moves this sequence switch out of position 16 and into position 18.

In position 18 of sequence switch 300, a circuit is completed from grounded battery, power magnet 73, contact 316, to ground. Brush rod 25 is moved downwardly under the control of magnet 73, and when it arrives in its normal position, a brush 74 will engage a segment 75 and a circuit will be completed from grounded battery, power magnet of sequence switch 300, contact 317, segment 75, brush 74, to ground, for moving sequence switch 300 into position 1.

When the incoming sequence switch 300 arrived in position 8, a circuit was completed from grounded battery, winding of relay 43, terminal 44, brush 45, contact 311, to ground. This relay remains energized during conversation, but when sequence switch 300 leaves position 16, relay 43 is deënergized and a circuit is completed from grounded battery, winding of power magnet of sequence switch 400, contact 410, armature and back contact of relay 43 to ground, for moving this sequence switch out of position 16 and into position 18.

In position 18 of sequence switch 400, a circuit is completed from grounded battery, winding of power magnet 76, contact 411, to ground. The brush rod 50 is moved downwardly under the control of magnet 76, and when it reaches normal, a circuit is completed from grounded battery, power magnet of sequence switch 400, contact 412, segment 58, brush 77 to ground, for moving this sequence switch into position 1. All parts of the apparatus have now been returned to normal and are ready for reuse.

It is to be noted that the sender sequence switch 200 is resting in position 1 and the testing control sequence switch 100 is resting in position 1, so that the testing operator, by plugging into a jack associated with another switch and depressing a start key, may send through another call of the same designation as that just sent without the necessity of again setting up the desired number on the key set.

If at any stage of operation the operator wishes to discontinue the test, he may do so by depressing disconnect key 95. The depression of disconnect key 95 at this time will complete a circuit by closing its right-hand contacts from grounded battery, winding of the 0 counting relay, winding of the 0' counting relay, conductor 14 to ground. The energized condition of relay 0' will complete a circuit from grounded battery, power magnet of sequence switch 200, conductor 15, inner armature and front contact of the 0' counting relay, conductor 206, to ground, which will drive sequence switch 200 into position 1. Sequence switch 100 will be moved out of positions 2 and 3 as previously described, and, upon arriving in position 4, a circuit will be completed from grounded battery, power magnet of sequence switch 100, contact 131, closed left-hand contacts of key 95, armature and back contact of relay 3 to ground, for moving sequence switch 100 through positions 4, 5 and 6°and into position 1.

If lamp 12 continues to burn steadily, indicating to the operator that ringing current is being applied to the desired line and that the party being called fails to respond, the operator may release the connection by depressing key 95, in which case sequence switch 100 will be moved out of position 5 and through 6 by the last traced circuit above.

As described, it has been assumed that incoming and final switches were to be tested. The arrangement is, however, also suitable for operating an indicating device at a manual operator's position. If key 96 is depressed, the same impulses will be sent as before, and in addition, stations impulses will be sent, since relay 9 is not energized and sequence switch 200 will come to rest in position 18. The energized condition of relay 97 will, at this time, cause sequence switch 200 to move through positions 2, 4 and 6 by energizing the 0' counting relay through contact 217.

If start key 98 is depressed, tandem impulses will be sent out before the sets of impulses previously described are sent, since the deënergized condition of relays 9 and 97 allows sequence switch 200 to stop in positions 2, 4 and 6. The deënergized condition of relay 9 will again allow stations impulses to be sent under this condition.

What is claimed is:

1. In a device for testing automatic apparatus, a sender including a key set and a set of counting relays arranged to be operated in accordance with the setting of said key set, and means for reoperating said set of counting relays in accordance with the initial setting of said key set without resetting said key set.

2. In a device for testing automatic apparatus, a sender arranged to transmit a plurality of sets of impulses, said sender including a key set and a set of counting relays arranged to be operated in accordance with the setting of said key set, and means for reoperating said set of counting relays in accordance with the initial setting of said key set without resettting said key set.

3. In a device for testing automatic apparatus, a start key, a sender including a key set and a set of counting relays arranged to be operated in accordance with the setting of said key set upon depression of said start key, and means to reoperate said counting relays without resetting said key set upon the redepression of said start key.

4. In a testing system, a sender including a key set and a set of counting relays arranged to be operated in accordance with the setting of said key set, automatic apparatus to be tested, means for associating said sender with the apparatus to be tested, and means to cause the reoperation of said counting relays in accordance with the setting of said key set upon the association of said sender with other apparatus to be tested without resetting said key set.

5. In a device for testing automatic apparatus, a key set, a sender arranged to transmit a plurality of sets of impulses, a multi-position sender control switch associated with said sender, a multi-position test controlling switch, means to operate said sender in accordance with the setting of said key set, means to restore said sender control switch to its normal position upon completion of the sender's operation, means to restore said test-controlling switch to its normal position upon completion of the test, and means to reoperate said sender without resetting said key set.

6. In a testing system, a sending device, automatic apparatus to be tested, means for associating said sending device with apparatus to be tested, visible means for indicating the busy or non-busy condition of the apparatus with which said sending device has been associated, and means operated when said sending device is associated with apparatus to be tested for controlling the operation of said visible means and said sending device.

7. In a testing system, a sending device, automatic apparatus to be tested, means for associating said sending device with apparatus to be tested, visible means for indicating the busy or non-busy condition of the apparatus with which said sending device has been associated, and a relay arranged to be energized when said sending device is associated with busy apparatus for operating said visible means to indicate that the apparatus is busy and also to prevent the operation of said sending device.

8. In a testing system, a sending device, a key set, automatic apparatus to be tested, a testing operator's head set, means to operate said sender in accordance with the setting of said key set, means to establish connection between said head set and the apparatus being tested at a desired time, means to disconnect said head set upon completion of the test, and means to reoperate said sender without resetting said key set.

9. In a testing system, a sending device, a key set, automatic apparatus to be tested, means for associating said sending device with apparatus to be tested, a testing operator's head set, visible signals, means to operate said sender in accordance with the setting of said key set, means to operate said visible signals to indicate the progress of the test, means to connect said head set to the apparatus being tested at desired times, and means to reoperate said sender without resetting said key set.

10. In a device for testing automatic apparatus, a sender arranged to transmit a plurality of sets of impulses, a plurality of start keys controlling the number of sets of impulses to be sent, means to operate said sender in accordance with the setting of said key set upon depression of one of said start keys, and means operable upon the completion of the sender's operation to cause its reoperation by again depressing said start key.

11. In a device for testing automatic apparatus, a key set, a sender arranged to transmit a plurality of sets of impulses, a plurality of start keys, relays, means to operate said sender to transmit a desired number of sets of impulses with the setting of said key set upon depression of a start key, the number of sets of impulses sent being determined by the actuated or non-actuated condition of said relays, and means to cause reoperation of said sender without resetting said key set.

12. In a sending device, a key set comprising a plurality of keys arranged in digit columns, a counting device, a controlling switch, means to set up a number on said key set, means including said counting device to transmit a set of impulses for each key depressed, means to transmit an additional set of impulses, and means operated in certain positions of said controlling switch in accordance with the setting of the keys in certain ones of said digit columns to control the operation of said counting device during the sending of said additional set of impulses.

In witness whereof, we hereunto subscribe our names this 28th day of December A. D. 1916.

ALBEN E. LUNDELL.
HERBERT G. EDDY.